(12) United States Patent
Larson

(10) Patent No.: US 7,800,262 B1
(45) Date of Patent: Sep. 21, 2010

(54) CENTRIFUGAL DROP FAN AND VALVE WITH SLIDING MOTOR

(76) Inventor: John Leo Larson, 6109 Meadowlark NE., Rockford, MI (US) 49341

( * ) Notice: Subject to any disclaimer, the term of this patent is extended or adjusted under 35 U.S.C. 154(b) by 0 days.

(21) Appl. No.: 12/435,459

(22) Filed: May 5, 2009

(51) Int. Cl.
*H02K 9/00* (2006.01)
*H02K 41/02* (2006.01)
*F04B 35/04* (2006.01)

(52) U.S. Cl. ............... 310/58; 310/12.14; 310/191; 415/119; 417/423.7

(58) Field of Classification Search ............ 310/58, 310/191, 12.14; 417/423.7; 415/119; *H02K 41/02; F04B 35/04*
See application file for complete search history.

(56) References Cited

U.S. PATENT DOCUMENTS

| | | | | |
|---|---|---|---|---|
| 2,869,008 | A * | 1/1959 | Carlsen | 310/209 |
| 4,079,597 | A * | 3/1978 | Lindner et al. | 192/142 R |
| 4,152,094 | A * | 5/1979 | Honda et al. | 415/119 |
| 5,045,741 | A * | 9/1991 | Dvorsky | 310/209 |
| 5,117,143 | A * | 5/1992 | Iddings | 310/191 |
| 5,176,509 | A * | 1/1993 | Schmider et al. | 417/423.7 |
| 5,716,200 | A * | 2/1998 | Mirumachi et al. | 417/360 |
| 6,394,768 | B1 * | 5/2002 | Fukuda et al. | 417/423.15 |
| 6,591,612 | B2 * | 7/2003 | Bolz et al. | 60/608 |
| 7,425,119 | B2 * | 9/2008 | Bolz | 417/366 |
| 2002/0134082 | A1 * | 9/2002 | Bolz et al. | 60/608 |
| 2003/0184177 | A1 * | 10/2003 | Enzinna | 310/93 |
| 2004/0253127 | A1 * | 12/2004 | Nakano et al. | 417/423.7 |

\* cited by examiner

*Primary Examiner*—Quyen Leung
*Assistant Examiner*—John K Kim

(57) ABSTRACT

A combined centrifugal fan and valve to exhaust air outside of a building when running and to prevent air from escaping when not running. The electrical motor design is to allow the rotating parts of the motor to slide along the motor shaft axis. The vertical position of the motor will allow the sliding capacity of the motor to utilize the weight of the fan, motor shaft and motor armature to hold the base plate of the fan tightly against the inlet opening when the motor is not running and lift the fan, motor shaft and motor armature when running by the magnetic forces of the motor windings.

2 Claims, 4 Drawing Sheets

CENTRIFUGAL DROP FAN AND VALVE WITH SLIDING MOTOR

BACKGROUND ART

The problem that this design solves is when winds outside of a building blow across the exhaust ventilation opening, like a bathroom fan, cooking exhaust fan or clothes dryer. The Ventura affect the wind outside of a building generates in the exhaust vent piping, lifts the light, flat trap door that most of the above mentioned devices now employ. This should lead to improved energy efficiency with buildings using devices that utilize this design. This should keep heated air inside of the building during the winter months and vice versa, cooler air inside during the summer months when the buildings are using air conditioning. On heating devices like fireplaces, water heaters and furnaces, this design would be utilized by closing the exhaust ventilation pipe to inhibit a heat induced draft in the exhaust piping and hold more of the heat in the device thus making them more energy efficiency too.

SUMMARY OF THE INVENTION

A combined centrifugal fan and motor for venting air when running; and preventing air from passing when not running; by using a vertical shaft motor that will slide downward by gravity when the electricity is removed from the motor and closing the inlet opening with the base plate of the fan. When electricity is supplied to the motor, a solenoid and/or magnetic solenoid like action of the motor will lift the motor shaft and centrifugal fan assembly into operational position, opening up a ventilation path below the fan wheel and spin the assembly to move air.

DETAILED DESCRIPTION OF THE INVENTION

Referring to FIG. 1. this design utilizes an electrical motor in the vertical position, along the axis of rotation, with the lower part of the motor frame/housing (7) extended to allow the motor shaft (4), motor armature (3) and centrifugal fan (2) to drop by gravity to the bottom of the motor frame/housing assembly (7) between the motor guide bearings (5), closing the inlet opening (9), at the bottom of the fan housing (1), with the base plate of the fan (2) such that the base plate defines a valve that closes and opens the inlet. Once electricity is supplied to the motor windings (6), the fan (2), motor shaft (4) and motor armature (3) will be pulled into operational position by the solenoid-like magnetic effect between the motor armature (3) and the motor windings (6), and spin the fan (2) mounted at the bottom of the motor shaft (4). The lifting of the motor armature (3), motor shaft (4) and fan (2) into operational position will open the inlet opening (9) and start spinning the assembly. The spinning centrifugal fan (2) will then suck air into the inlet opening (9) and push air out the exhaust opening (8). When the electricity is removed from the motor windings (6), the fan (2), motor shaft (4) and motor armature (3) assembly will drop by gravity and stop spinning with the base plate of the fan inhibiting any air from entering the inlet opening (9).

Figure 1:
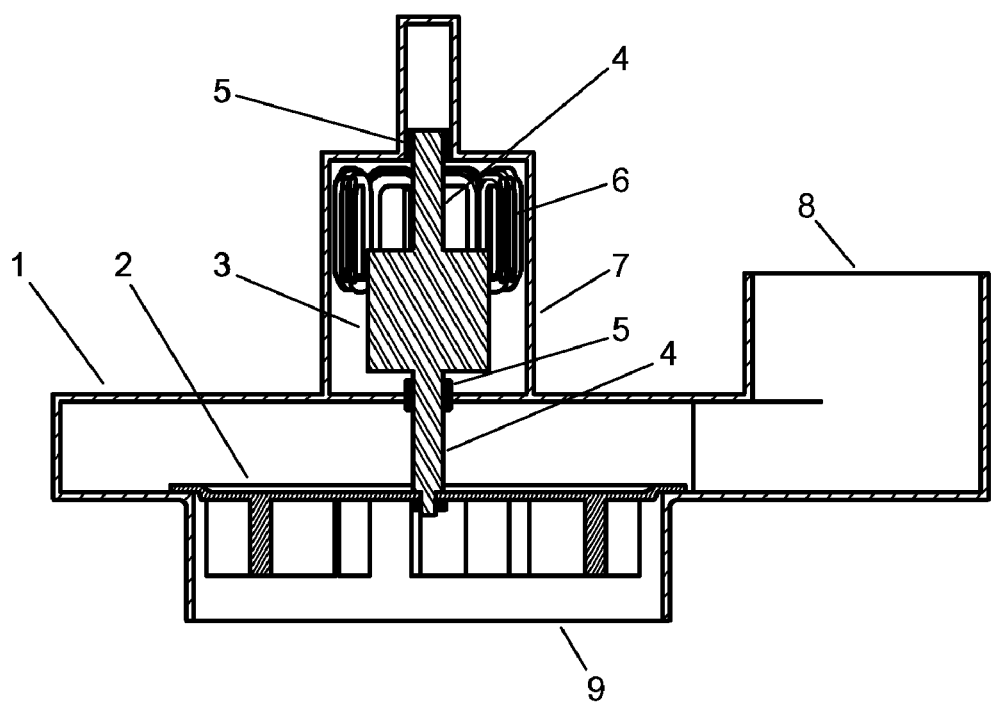
FIG. 1. Is a cross section view through the center of the product along the axis of the electrical motor when no electricity is supplied to the motor.
Figure 2:
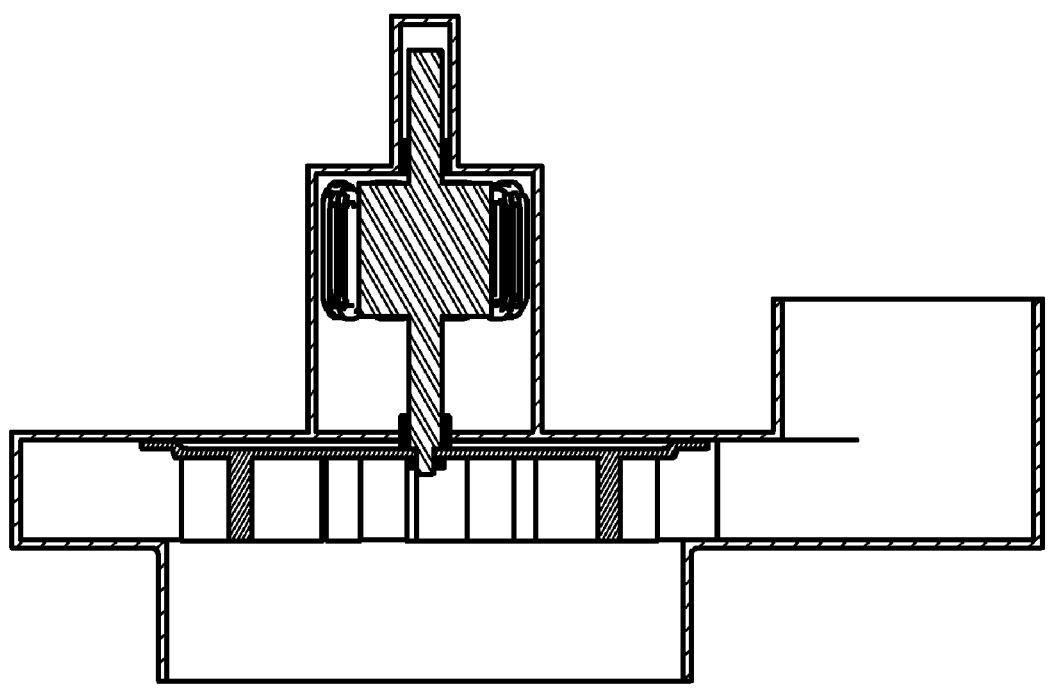
FIG. 2. Is a cross section view through the center of the product along the axis of the electrical motor, in operational position, when electricity is supplied to the motor.
Figure 3:
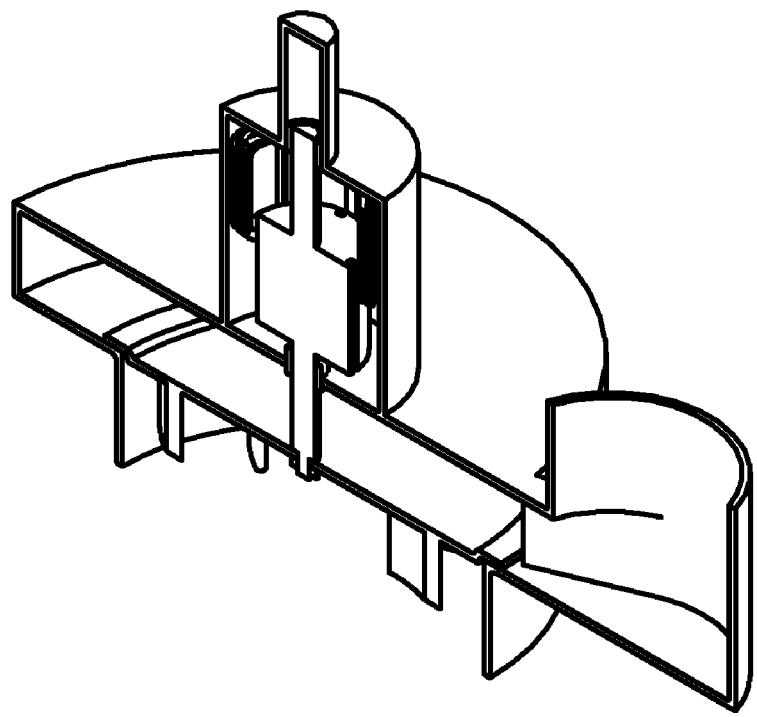
FIG. 3. Is an isometric, cross section view showing the inlet opening closed by the base plate of the fan when electricity to the motor has been interrupted.
Figure 4:
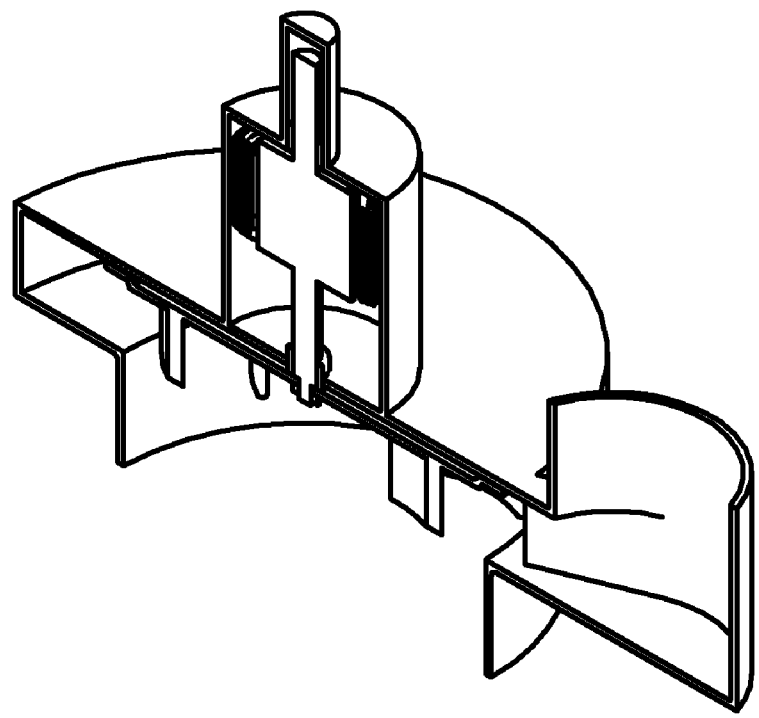
FIG. 4. Is an isometric, cross section view showing the fan and motor in operational position when electricity is supplied to the motor, and moving air through the fan housing.
Figure 5:
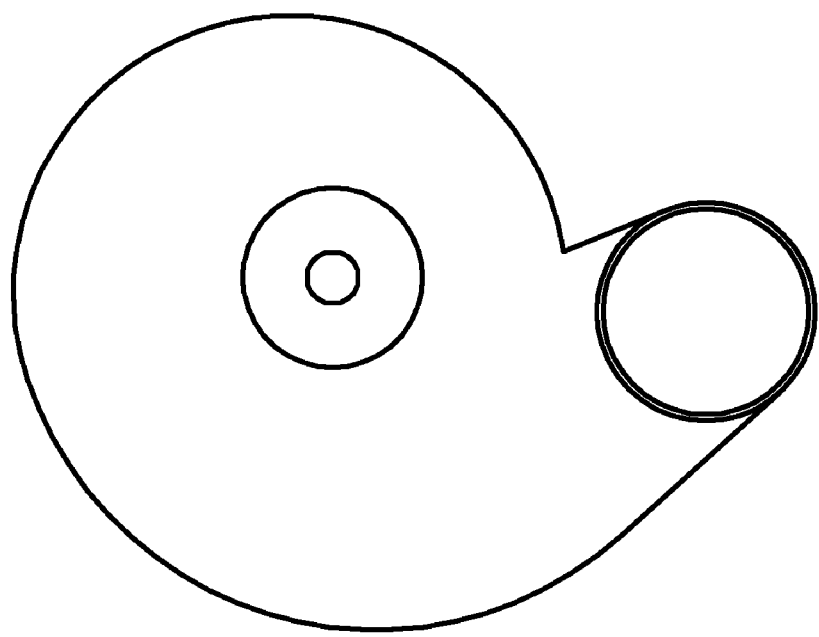
FIG. 5. Is a top view showing the motor housing and fan housing.
Figure 6:
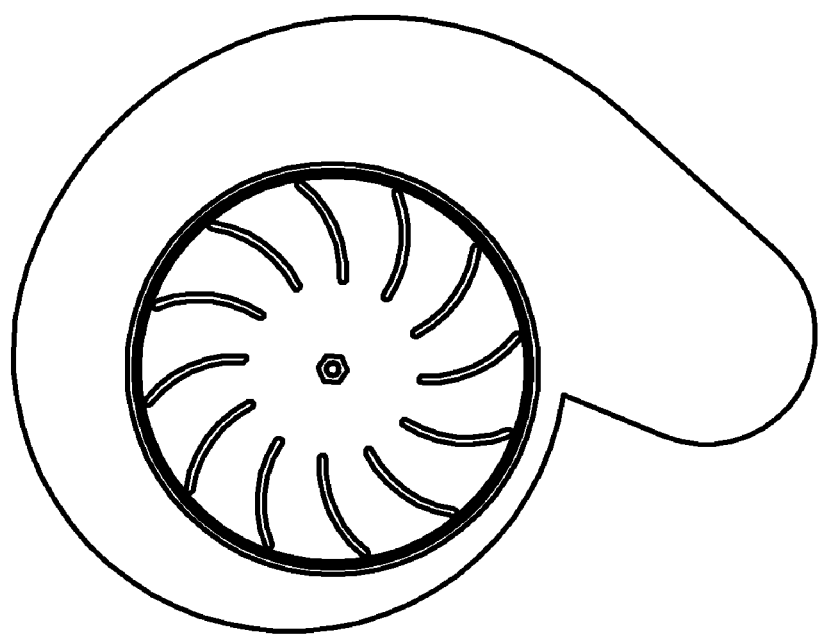
FIG. 6. Is a bottom view showing the fan and the fan housing.

I claim:

1. A fan comprising a housing with inlet and exhaust openings and a passage extending there through and a sliding electrical motor that is capable of lateral movement along the shaft of rotation of the motor, the fan connected with the shaft and located in the passage and the fan having a base late defining a valve that closes and passage, whereby the lateral movement is incorporated to open the valve and allow air to move through the passage and to close the valve and prevent movement of air through the passage, the lateral movement being achieved by any single or combination of the following means: gravity, an electrical solenoid, magnet(s), or electrical magnetic attraction between the motor components.

2. A fan base plate comprising a combined fan and valve, suitable for ventilation use to move air when on and substantially prevent air passage when off by use of a sliding electrical motor that is capable of lateral movement of a shaft of rotation of the motor, along the shaft of rotation, the base plate being adapted to move responsive to motor shaft lateral movement such that the base plate substantially prevents air moving when off and allows air to move when on.

* * * * *